(No Model.)  2 Sheets—Sheet 1.

C. F. BEAMAN.
Machine for Making Sheet Metal Pans.

No. 237,084. Patented Feb. 1, 1881.

Witnesses:
F. B. Townsend
Wm. Rotthoff

Inventor:
Charles F. Beaman
per Lotz & Dyer
Attorneys.

(No Model.) 2 Sheets—Sheet 2.
C. F. BEAMAN.
Machine for Making Sheet Metal Pans.
No. 237,084. Patented Feb. 1, 1881.
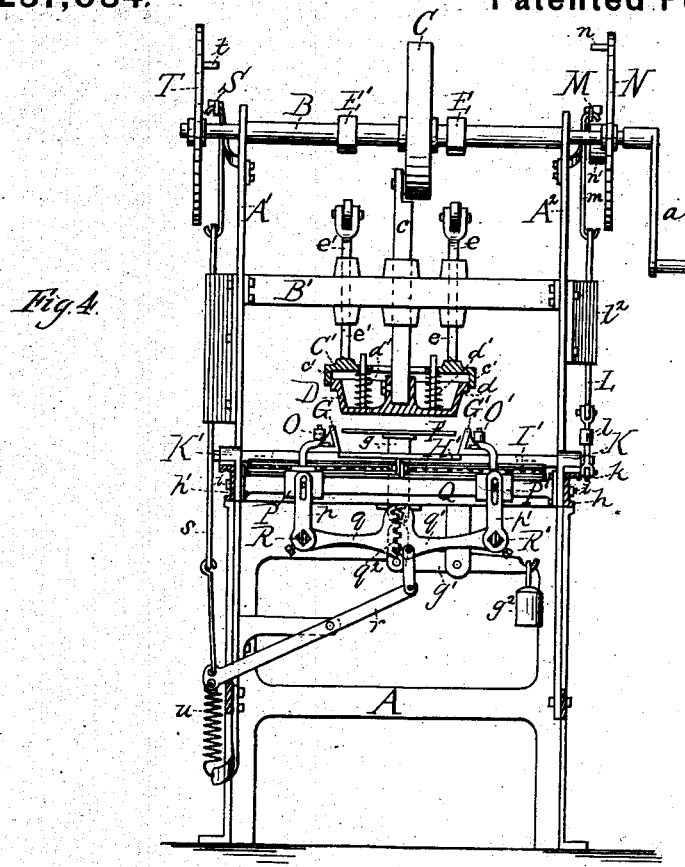
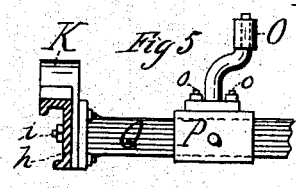
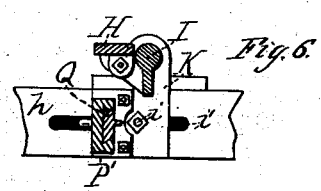
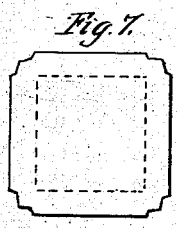
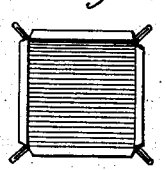
Witnesses:
J. B. Townsend
Wm. Rotthoff
Inventor:
Charles F. Beaman,
per Lotz & Dyer,
Attorneys.
N. PETERS, PHOTO-LITHOGRAPHER, WASHINGTON, D. C.

UNITED STATES PATENT OFFICE.

CHARLES F. BEAMAN, OF CHICAGO, ILLINOIS, ASSIGNOR TO CRAGIN BROTHERS & CHANDLER, OF SAME PLACE.

MACHINE FOR MAKING SHEET-METAL PANS.

SPECIFICATION forming part of Letters Patent No. 237,084, dated February 1, 1881.

Application filed July 19, 1880. (No model.)

*To all whom it may concern:*

Be it known that I, CHARLES F. BEAMAN, of Chicago, in the county of Cook and State of Illinois, have invented certain new and useful Improvements in Machines for Making Sheet-Metal Pans, of which the following is a specification.

The object I have in view is to produce a simple and cheap machine for forming the ordinary seamless baking or dripping pans, which machine will be capable of turning out a large number of pans in a short time, can be easily and quickly adjusted to form pans of different sizes, and will bend the metal at the corners of the pan by two operations instead of by one movement, as heretofore, so that the metal will be subjected to less strain at those points, and will not be so liable to break as heretofore, and the pans can be made of a cheaper quality of iron.

My invention therein consists in the several peculiar contrivances for accomplishing these objects, and in the various novel combinations of the operative parts, all as more fully hereinafter explained, and pointed out by the claims.

Figure 1:
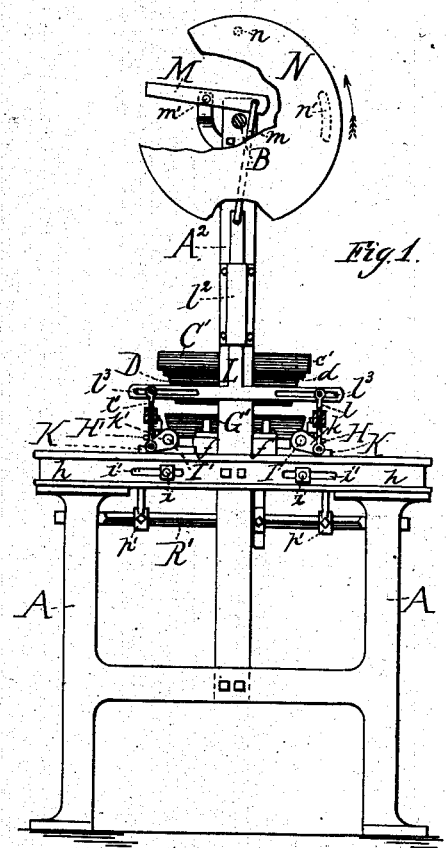
Figure 2:
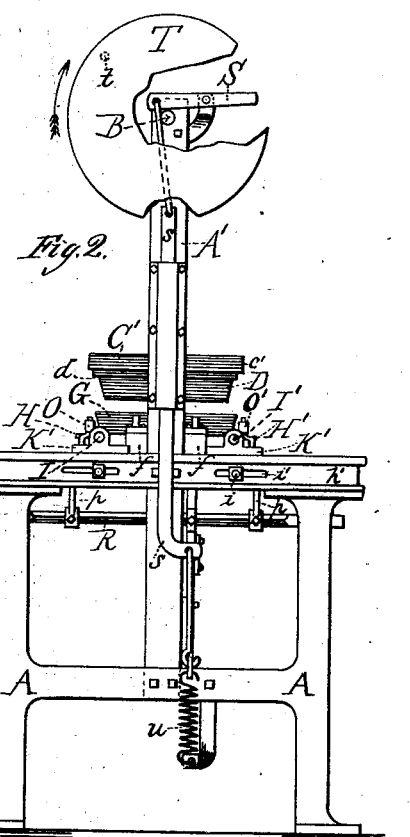
Figure 3:
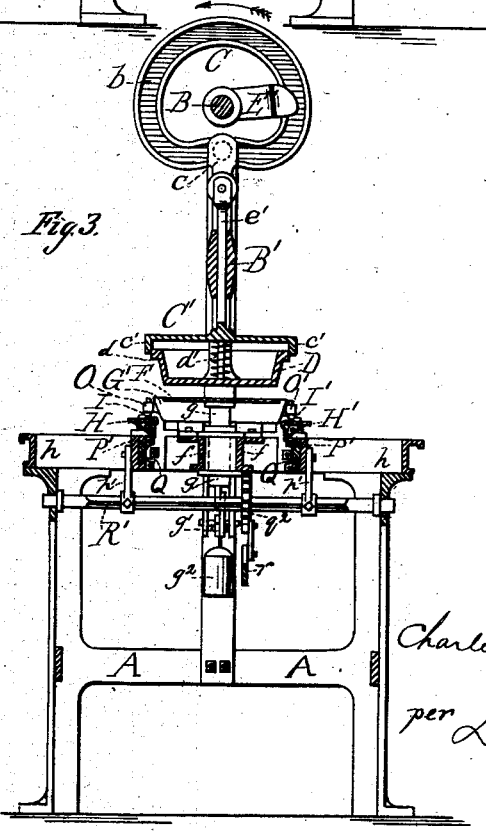

In the accompanying drawings, forming a part hereof, Figure 1 is an elevation of the machine from one side; Fig. 2, an elevation taken from the opposite side; Fig. 3, a vertical cross-section of the machine from front to rear; Fig. 4, a front elevation of the machine, the frame being broken away to show the parts, and the male die and edge-turner being in section; Fig. 5, a separate elevation of one of the corner-folders, showing its supporting and guiding bar; Fig. 6, a cross-section, through the sliding block, of one of the corner-folders and the supporting and guiding bar, one of the end wings of the female die and its operating rock-bar being also shown in cross-section; Fig. 7, a view of the blank from which the pan is formed; Fig. 8, a top view of the partly-formed pan, showing the same with the sides turned up, as it is after the male die has completed its downward movement; Fig. 9, a top view of the same after the folding-wings have turned up the ends of the pan; Fig. 10, an end elevation of the pan after the corners have been folded, but before the edge-turner operates, and Fig. 11 an end elevation of the pan after the edge has been turned down.

Like letters denote the same parts in all the figures.

A represents the frame of the machine, from the center of the sides of which rise standards A' A², in the tops of which standards is journaled the operating-shaft B. A hand-crank, $a$, is shown on the end of the shaft B, Fig. 4, for turning the same; but I propose in use to have the machine driven by power. This I prefer to do by providing the machine with a driving-shaft, (not shown,) supported from the frame at about the same elevation as the shaft B and parallel with such shaft B, and having at one end a balance-wheel connected by a belt with the power. The driving-shaft would be provided with a pinion which would mesh with a large gear-wheel sleeved on the shaft B. This sleeved gear-wheel would be locked, when desired, to the shaft B by means of an intermittent or self-uncoupling clutch of suitable construction, so that by moving a foot or hand lever the gear-wheel would be locked to the shaft B and the machine would be operated, while, when the machine has completed its movements and the male die has returned to its uppermost position, the clutch would unlock itself and the machine would stop. These devices for connecting the machine with the power are not shown in the drawings, or particularly described herein, for the reason that they form no part of the invention set forth in this application, and for the further reason that on small machines the shaft B may be turned by hand.

On the center of the shaft B is keyed a cam, C, having a suitable cam-groove, $b$, which is connected directly, or through a pivoted arm, with the upper end of a vertically-reciprocating rod or bar, $c$, which slides through a box held by a cross-bar, B', connecting the standards A' A², and is guided thereby.

To the lower end of the rod $c$ is removably secured the male die D, of usual form, having a shape like the inside of a pan, and provided, as usual, with a shoulder, $d$, for turning out, horizontally, the upper edge of the pan.

Upon the male die D is situated a frame, C', having its outer edge, $c'$, projecting down outside of the male die. This frame is supported above the male die by spiral springs $d'$, and is removably connected with rods $e\ e'$, passing upwardly through boxes on the cross-bar B'. The rods $e\ e'$ have anti-friction rollers in their upper ends, and are pushed down simultaneously by cams E E', keyed on the operating-shaft B. The effect of pushing down the frame C' is to turn down the edge of the pan, so as to prepare the same for the wiring-machine, as will appear hereinafter.

The frame of the machine is provided with a narrow bed, $f$, Fig. 3, extending across the frame between the standards A' A². Through the center of the bed $f$ works vertically a rod, $g$, to the upper end of which, above said bed, is removably attached a rectangular horizontal plate, F, of the size of the bottom of the pan. The lower end of the rod $g$ is connected with a lever, $g'$, pivoted in hangers, and carrying a weight, $g^2$, on its outer end. The weight $g^2$ exerts a constant and equal upward pressure upon the plate F, and sustains it on a level with the top of the female die until it is forced downwardly by the male die.

The female die is composed of adjustable stationary sides and adjustable pivoted and turning end wings or folders. The sides of the female die are formed by inclined plates G G', which are removably and adjustably bolted to the bed $f$, Fig. 4, so that they can be set forward or back for pans with shorter or longer ends, or can be replaced by other plates when pans having shorter or longer sides are to be formed. The ends of the female die are formed by plates H H', of the size of the ends of the pans they are intended for. These plates are removably secured to rock-bars I I', which are journaled in boxes K K'. The rock-bars extend across the frame of the machine at the ends of the stationary side plates, G G', and the boxes K K' rest upon the side rails, $h\ h'$, of the frame. The boxes K K' are secured to such side rails by bolts $i$, projecting through slots $i'$ in the side rails, so that such boxes can be adjusted toward or away from the center of the machine to accommodate shorter or longer side plates, G G'. The plates H H' are removably secured to the rock-bars I I', so that they can be changed to suit the length of the ends of the pan that is to be formed.

At one side of the machine the journals of the rock-bars I I' are extended through the boxes K K', and have cranks $k\ k'$ or crank-disks keyed thereto. These cranks are connected, by adjustable links $l\ l'$, with the horizontal arms of an inverted-T slide, L, which is guided in one or two bearings, $l^2$, secured to the standard A². The links $l\ l'$ are made adjustable in their length by means of turn-buckles, as shown, or by being adjustably secured to the cranks, and they are secured to slots $l^3$ in the horizontal arms of the slide L. The links are adjustable in their length, so as to regulate any difference of motion there may be in the end-folding plates H H'. The links are adjustably connected with the horizontal arms of the slide, so that they can be moved bodily back and forth with the boxes K K', and will always pull vertically on the cranks $k\ k'$, so as to give the cranks the same extent of movement, no matter what the adjustment is. The slide L, by being a rigid T, will assure the equal, certain, and simultaneous movement of the end-folding plates.

The slide L is connected at its upper end by a link, $m$, with a horizontal lever, M, pivoted at $m'$ to an arm from the standard A², or to a portion of the frame. The lever M crosses the shaft B above or below the same, and near to such shaft receives the link $m$, while its outer end is free to be depressed by a pin-wheel, N, keyed on the end of the shaft B. The wheel N has an inwardly-projecting pin, $n$, at such a point on or near its periphery that after the male die has completed its downward movement such pin will strike the lever M, and, depressing its outer end, will raise its inner end, and, through the T-slide, the cranks and rock-bars will turn the end-folders H H' up against the ends of the male die, closing the female die. When the pin $n$ passes the lever M the end-folders drop back to their normal position by the weight of the parts. At another point of its periphery the wheel N has a projecting curved plate, $n'$, which depresses the lever M some time after the pin $n$, and by reason of its extension holds such lever down for a short time. The plate $n'$ acts after the corner-folders have operated and just before the cams E E' depress the edge-turner C', the object being to raise the end-folders H H' and close the ends of the female die, so that the pan will be supported at the ends, as well as at the sides, against the downward pressure of the edge-turner, which works just outside of the female die.

O O' are the corner-folders, composed of curved arms having vertical anti-friction rollers on their upper ends, which are situated on a level with the female die, at the corners thereof, and act upon the pan while the male die is in its lowest position. The arms O O' rise from sliding blocks P P', to which the arms are adjustably secured by bolts $o$, Fig. 5. The blocks P P', on each side of the bed of the machine, slide upon a bar, Q, which extends horizontally across the machine between the boxes K K', and is secured to such boxes, so that when the end-folders H H' are adjusted the corner-folders will be moved with them. The adjustment of the corner-folders on the sliding blocks P P' is intended to adapt them for pans having ends of different length, while the first adjustment described adapts the corner-folders for pans having sides of different length.

The blocks P P' are connected with slotted arms $p\ p'$, which are sleeved on square shafts R R', and secured at any point of adjustment by set-screws. The square shafts R R' extend across the machine at right angles to the bars $q$ and beneath the bed $f$, and are journaled at their ends in the frame of the machine. Near the center of the machine the shafts R R' have inwardly-projecting arms $q\ q'$, which work together at their inner ends through segmental gears $q^2$, Fig. 4. One of the arms $q\ q'$, at or near its inner end, is connected by a link with a lever, $r$, pivoted to the frame-work. At its outer end the lever $r$ is connected by a link with a vertical slide, $s$, working through a box secured to the standard A'. The slide $s$ is connected by a link with a lever, S, like the lever M on the opposite side of the machine.

A pin-wheel, T, is keyed to the end of the shaft B outside of the lever S. This wheel has a pin, $t$, which depresses the lever S, and, through the slide $s$, lever $r$, and arms $q\ q'$, gives the shafts R R' a simultaneous rocking movement and operates the corner-folders. A spring, $u$, or a weight, may be placed at any suitable point to throw the corner-folders back to their normal position. The pin $t$ acts upon the lever S immediately after the pin $n$ depresses the lever M, and before the curved plate $n'$ acts upon such lever M.

By reason of the advantage obtained by the levers and arms, very little power is required to operate the corner-folders. The same may also be said of the end wings or folders of the female die.

The machine being constructed as described its operation is as follows: A plate of sheet-iron of proper size, and cut in the usual manner at the corners (shown in Fig. 7) is placed upon the plate F, its position being determined by suitable guide-stops, (not shown.) The machine is then started, the operating or cam shaft turning in the direction shown by the arrows. The male die D is forced down by the cam C, carrying the edge-turner C' with it until it reaches the bottom of the female die—that is, has forced the plate F down close to the bed $f$—when the male die stops and holds the pan in the female die while the subsequent operations take place. The result of this downward movement of the male die is to turn up the sides of the pan to the position shown in Fig. 8, the upper edge of the sides being turned outward by the shoulder $d$. The ends of the blank lie out flat, while the metal at the corners of the die is spread out obliquely, all as shown in Fig. 8. Now the pin $n$ strikes the lever M and the end-folders H H' rise, forcing the ends of the blank up against the male die, the corners of the pan projecting obliquely out of the corners of the female die. The end-folders then fall back out of the way. After this movement the pan appears as shown in Fig. 9. Now the pin $t$ strikes the lever S, and the corner-folders O O' come forward and fold the projecting corners over onto the ends of the pan close up to the out-turned upper edge of the pan, when such corner-folders move back to their first position. The curved plate $n'$ now depresses the lever M and again raises the end-folders H H'. The instant the end-folders reach their upper position, where they are held by the plate $n'$, the cams E E' push down the edge-turner C', and the edge of the pan is turned down to the position shown in Fig. 11. This completes the pan so far as the pan-forming machine is concerned, and prepares it for the wiring-machine. The cam C having now reached the end of the concentric portion of its groove the male die commences to rise. As soon as the end-folders are released from the down-turned edge of the pan, which is forced upwardly with the male die by the plate F, they drop back into their normal position. The male die continues to rise until it reaches its uppermost position, when the shaft B stops, having made one complete revolution. The pan is then removed from the machine, when another plate is put in position and the operation repeated.

To change the machine so as to form a pan of another size, it is necessary for each change to provide the machine with a different male die, and an edge-turning frame, C', and bottom plate, F, to correspond. If the pan is only to have longer or shorter ends, the stationary side plates, G G', of the female die are simply set back or forward; but if the sides of the pan are to be lengthened or shortened, different plates G G' must be placed in the machine. If the length of the ends is to be changed, new plates H H' are secured to the rock-bars I I'; but if the sides are only to be lengthened or shortened, the boxes K K' are simply set back or forward. The corner-folders are adjusted to suit every change in the size of the pan. Hence it will be seen that only one-half of the female die has to be removed in making most changes from one size pan to another. These changes and adjustments can be easily effected with very little loss of time, and the machine can be adapted for making any size of pan.

In building my machines they will be provided with all the extra parts necessary for the desired changes.

The advantages of my machine, other than those before particularly set forth, may be enumerated as follows: By constructing the female die with stationary side plates and with swinging end-folders which are not operated by the downward movement of the male die, but are moved after the male die has reached its lowest position, a number of difficulties and objections in the machines heretofore used are overcome. First, the machine is simpler and cheaper in construction, can be more easily adjusted, and can be kept in running order at a much less expense; second, the pans are drawn twice at the corners, instead of being formed complete by one movement, and the result is that the metal is subjected to much less strain at the corners of the pan, and cheaper iron can be used without the danger of breaking at such points; third, the corners can be turned while the pan is held solidly down in the female die by the male die, since the end-folders fall away and leave room for the corner-folders to operate. This assures the neat folding of the corners, and does away with the necessity of stopping the male die at an intermediate point in its upward movement.

By providing the machine with the edge-turner C' c' a wiring-machine with but one movement can be employed to complete the pans, and considerable expense in the construction of that machine can be thereby saved.

What I claim as my invention is—

1. In a pan-forming machine operated by a cam-shaft and having a reciprocating male die, the female die, having side and end wings that operate in succession upon the blank, substantially as and for the purpose set forth.

2. In a pan-forming machine, the combination, with the reciprocating male die, of the female die, having side and end wings that operate in succession upon the blank, and corner-folders that act after the end wings have operated, substantially as and for the purpose set forth.

3. In a pan-forming machine, the combination, with the reciprocating male die, of the stationary side wings or plates, between which the blank is forced by the male die, and the folding end wings operated simultaneously independent of the movement of the male die, substantially as and for the purpose set forth.

4. In a pan-forming machine, the combination, with the reciprocating male die, of the female die, having stationary side wings or plates, and folding end wings, which turn the ends of the blank and then fall back out of the way, and the corner-folders working across the open ends of the female die while the male die is in its lowest position, substantially as described.

5. In a pan-forming machine, the combination, with the reciprocating male die, of the female die, having stationary side wings and folding end wings, and the vertically-yielding plate forming the bottom of the female die, substantially as described and shown.

6. In a pan-forming machine, the combination, with the folding end wings of the female die, of the stationary side wings, adjustably and removably secured to the bed of the machine, substantially as described and shown.

7. In a pan-forming machine, the folding end wings of the female die, in combination with rock-bars, to which such end wings are removably secured, and boxes in which the rock-bars turn, adjustably secured upon the frame of the machine, such rock-bars being connected with the operating mechanism and working the said end wings independent of the movement of the male die, substantially as described.

8. In a pan-forming machine, the combination, with the end wings, the rock-bars upon which they are mounted, and the adjustable boxes in which said rock-bars turn, of the cranks on the ends of the rock-bars, and the slotted T-slide for operating the rock-bars simultaneously and permitting the adjustment of the boxes, substantially as described.

9. In a pan-forming machine, the combination, with the end-folders, rock-bars, adjustable boxes, cranks, and slotted T-slide, of the links connecting the T-slide with the cranks, such links being adjustable in their length, substantially as and for the purpose set forth.

10. In a pan-forming machine, the combination, with the folding end wings, of the rock-bars, the adjustable boxes, the cranks, the slotted T-slide, the adjustable connecting-links, the lever pivoted to the frame and connected with such T-slide, and the pin-wheel on the cam-shaft, which depresses the lever for operating such folding end wings, substantially as described and shown.

11. In a pan-forming machine, the combination, with the folding end wings of the female die, of the corner-folders, adjustable with such end wings toward and away from the center of the machine, substantially as and for the purpose set forth.

12. In a pan-forming machine, the combination, with the folding end wings, the rock-bars upon which they are mounted, and the adjustable boxes in which the rock-bars turn, of the corner-folders sliding on bars secured at their ends to such boxes, substantially as and for the purpose set forth.

13. In a pan-forming machine, the combination, with the corner-folders, mounted on blocks which slide on laterally-adjustable cross-bars, of slotted arms adjustably secured to rock-shafts running at right angles to said cross-bars, and connected with such blocks, and suitable means for connecting the rock-shafts with the operating-shaft, substantially as described.

14. In a pan-forming machine, the combination, with the adjustable corner-folders, the sliding blocks and cross-bars, of the adjustable slotted arms, the rock-shafts, the segmental gears connecting the rock-shafts, so that they will operate simultaneously, and suitable means for connecting the segmental gears with the operating-shaft, substantially as described and shown.

15. In a pan-forming machine, the combination, with the adjustable corner-folders, the sliding blocks, cross-bars, adjustable slotted arms, rock-shafts, and connecting segmental gears, of a pivoted lever beneath the bed of the machine, connected with one of such gears, and with a lever at or near the top of the machine, and a pin-wheel keyed on the cam-shaft for operating such corner-folders, substantially as described and shown.

16. In a pan-forming machine, the combination, with the male die, of an edge-turning frame supported on such male die and moving therewith, and pushed downward to turn the edge of the pan independent of the cam-rod that works such male die, substantially as described.

17. In a pan-forming machine, the combination, with the male die worked by a cam, of the edge-turning frame surrounding the cam-rod of the male die and connected with two operating-rods, which are forced down by cams situated on the same shaft as the die-cam and on opposite sides of such die-cam, substantially as described and shown.

18. In a pan-forming machine, the combination, with the male die worked by a cam, of the edge-turning frame supported on the male die by springs and moving therewith, and independent cams for forcing such edge-turning frame downward against the pressure of the springs while the male die is in its lowest position, substantially as described and shown.

19. In a pan-forming machine, the combination, with the male die and the folding-wings of the female die, of the edge-turning frame operated by cams, such folding-wings being raised into position before the edge-turner acts, substantially as and for the purpose set forth.

20. In a pan-forming machine, the combination of the vertically-moving male die, the female die, having side and end wings that operate in succession, the corner-folders, operating after the sides and ends of the pan have been formed, and the edge-turner, acting after the operation of the corner-folders, all substantially as described.

21. A pan-forming machine having, in combination, the male die having a simple vertical movement with a stop at each end thereof, the stationary side wings of the female die, between which the blank is forced by the male die, the folding end wings of the female die, which turn up the ends of the blank, then fall back to make room for the corner-folders, and then rise up again to support the edge of the pan, the corner-folders, folding the corners of the pan between the movements of the end wings, and the edge-turner, operating after the end wings have risen the second time, all of such movements, commencing with the first operation of the folding end wings, being effected while the male die is resting at the lowest limit of its movement, substantially as described and shown.

CHARLES F. BEAMAN.

Witnesses:
F. W. KASEHAGEN,
WM. ROTTHOFF.